United States Patent [19]

Masuyama et al.

[11] Patent Number: 5,092,361
[45] Date of Patent: Mar. 3, 1992

[54] INLINE TYPE CHECK VALVE

[75] Inventors: Tetsuo Masuyama, Hatogaya; Yasuo Suzuki, Tochigi, both of Japan

[73] Assignee: Nippon Piston Ring Co., Ltd., Tokyo, Japan

[21] Appl. No.: 488,269

[22] Filed: Mar. 5, 1990

[30] Foreign Application Priority Data

Mar. 23, 1989 [JP] Japan .............. 1-469373

[51] Int. Cl.$^5$ ............................................. F16K 15/02
[52] U.S. Cl. ............................... 137/543.21; 251/368; 251/904
[58] Field of Search .............. 137/543.17, 543.21, 137/540; 251/368, 904

[56] References Cited

U.S. PATENT DOCUMENTS

| | | | |
|---|---|---|---|
| 1,800,185 | 4/1931 | Thrush | 137/543.17 |
| 2,697,915 | 12/1954 | Chisholm | 137/543.21 X |
| 2,930,401 | 3/1960 | Cowan | 137/543.21 |
| 3,457,949 | 7/1969 | Coulter | 137/543.21 |
| 3,656,711 | 4/1972 | Toelke | 251/368 X |
| 3,913,614 | 10/1975 | Speck | 137/540 X |
| 4,140,148 | 2/1979 | Richter | 137/543.21 X |

FOREIGN PATENT DOCUMENTS 2076123 11/1981 United Kingdom ........... 137/543.21

Primary Examiner—Robert G. Nilson
Attorney, Agent, or Firm—Birch, Stewart, Kolasch & Birch

[57] ABSTRACT

An inline type check valve having a tubular body, a mushroom or umbrella-shaped piston axially, movably mounted in the tubular body, a coil spring disposed behind the piston in the body, and a hollow disk axially removably fixed to the body. Both the body and the disk made from a synthetic resin reinforced with fibers and resiliently hooked in each other. The piston has its periphery provided with a plurality of grooves to increase the cross-sectional area for fluid flow through the valve.

7 Claims, 3 Drawing Sheets

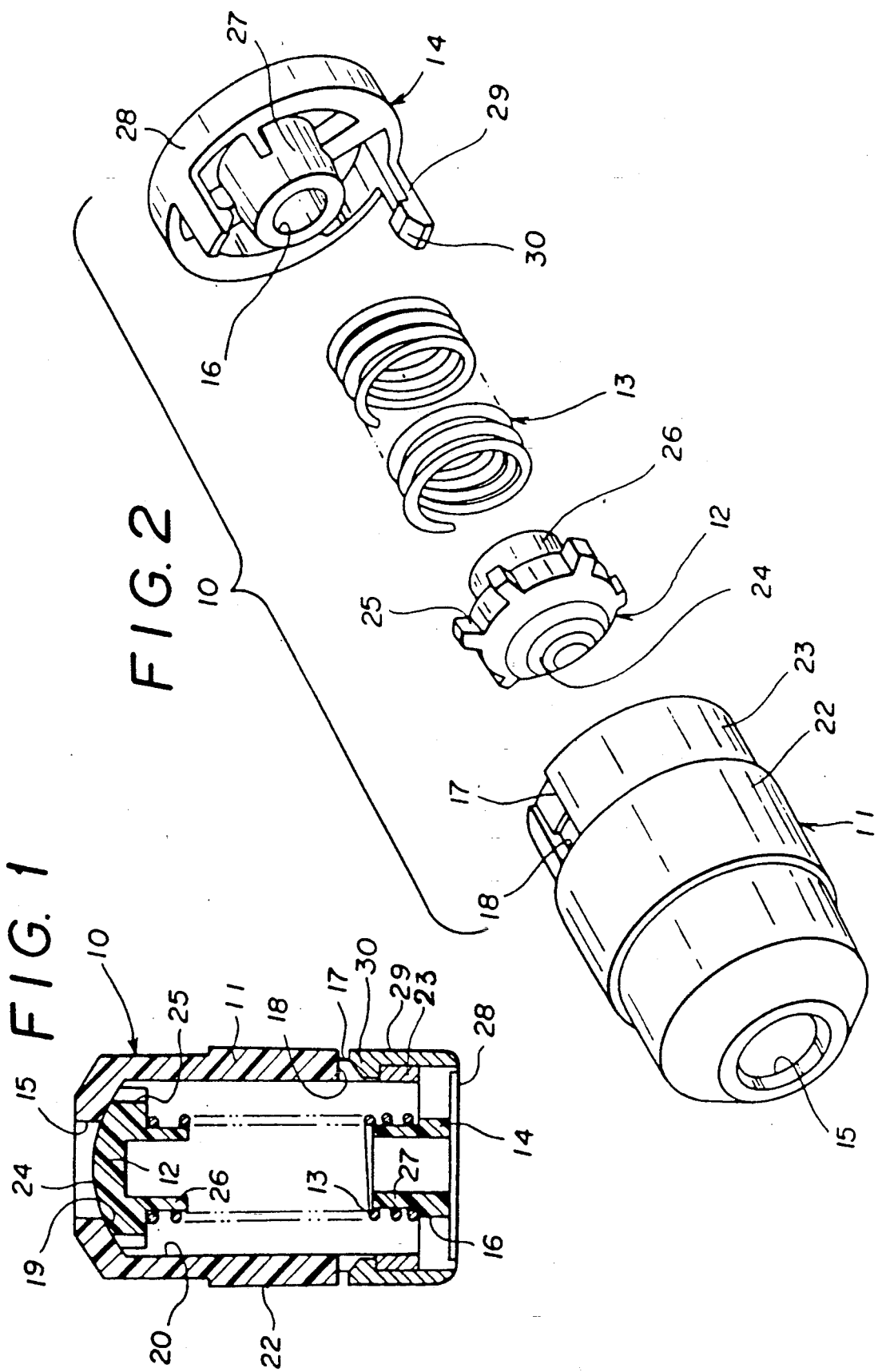

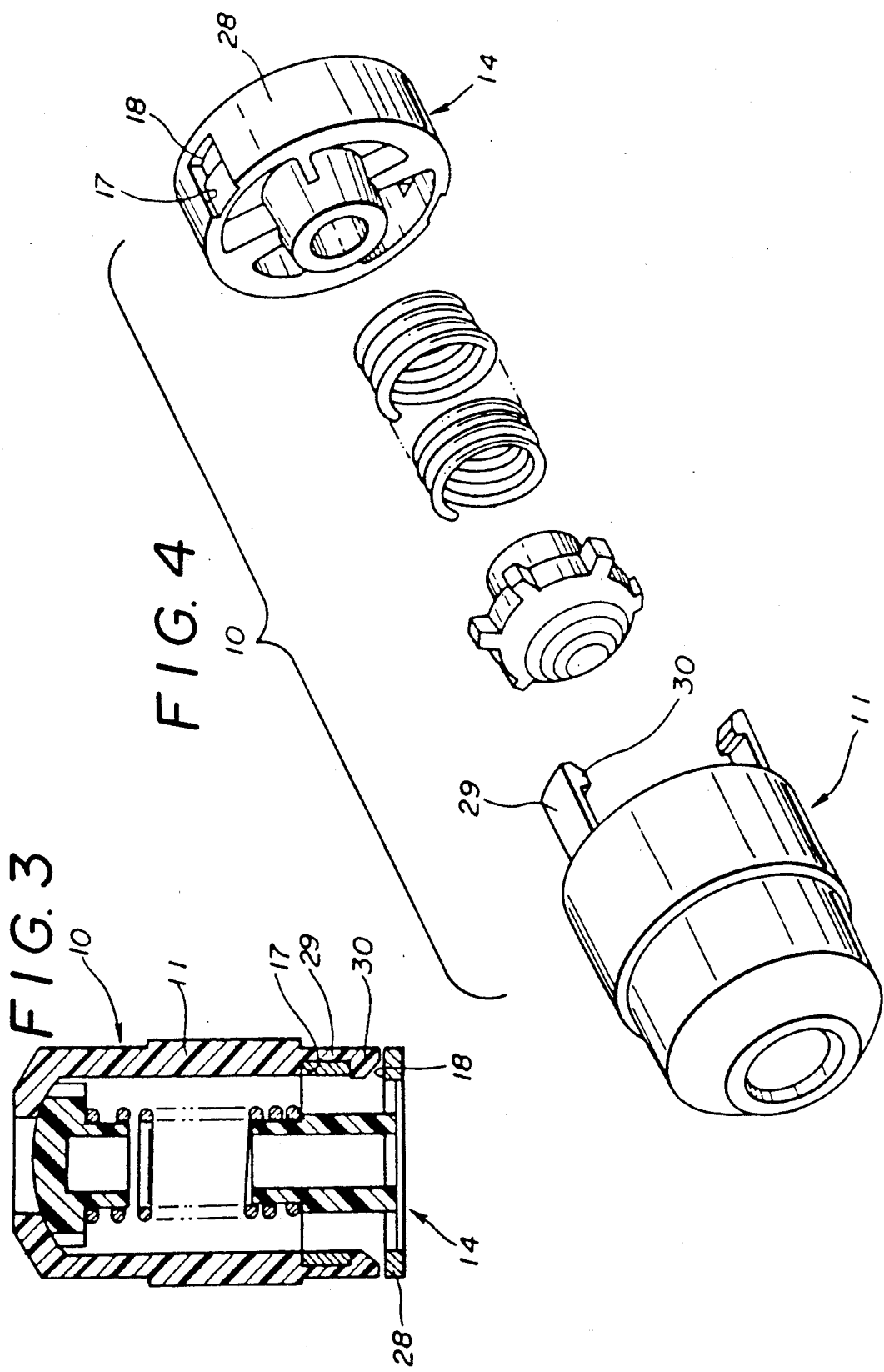

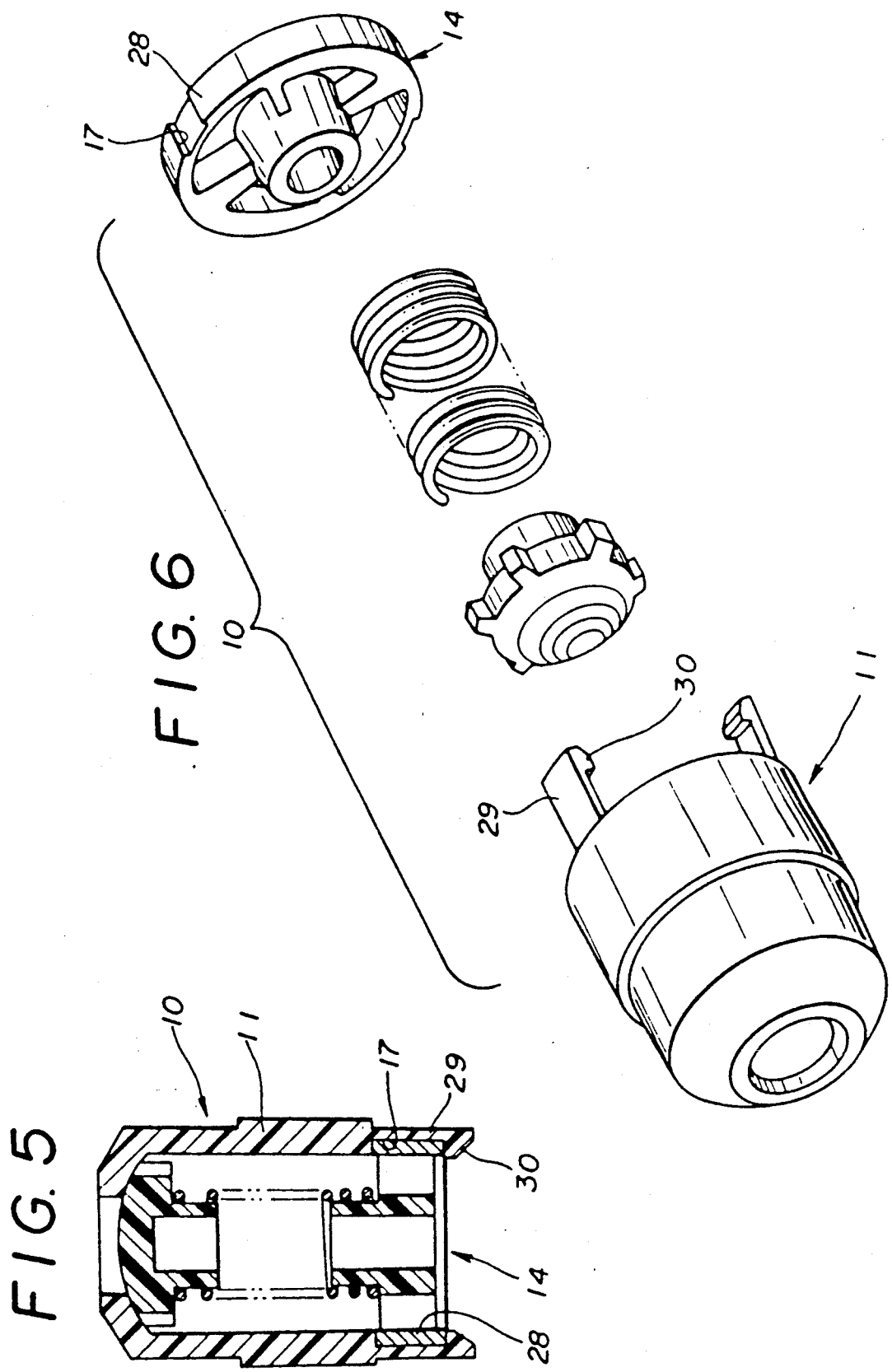

INLINE TYPE CHECK VALVE

BACKGROUND OF THE INVENTION

1. Field of the Invention

The present invention relates to an inline type check valve for use in a hydraulic circuit, and more particularly to a check valve provided with an umbrella-shaped piston which is quick in response.

2. Description of the Prior Art

As is known, an inline type check valve comprises a tubular body made of metal press-fitted in a hydraulic circuit, inlet and outlet formed at opposite ends of the body, a steel ball or poppet axially, movably mounted in the body, a coil spring mounted behind the ball or poppet in the body to force the ball or poppet against an annular seat surrounding the inlet, and a snap ring removably fixed to the body to back up the coil spring.

The known valve has disadvantages when used in an oil circuit. It is somewhat slow in response. The reason for this is that the ball is massive and less responsive and the poppet makes cylindrical contact with the inner periphery of the body and, therefore, is less responsive. A metallic contact between the seat and the ball or poppet offers no perfect sealing and allows oil leakage through the valve. In assembly, skill is required for the snap ring to be set against the coil spring in the body. It is costly to produce the metallic body within a desired tolerance. Besides, it can not increase the rate of flow without enlarging the diameter, because the rate depends on an annular clearance between the inner diameter of the body and the outer diameter of the ball or poppet.

SUMMARY OF THE INVENTION

It is an object of the present invention to provide an improved inline type check valve which is quick in response and free from leakage.

It is a further object to provide an improved inline type check valve which can be assembled with ease.

It is a still further object of the present invention to provide an improved inline type check valve which is easily produced within a desired tolerance.

It is still another object of the present invention to provide an improved inline type check valve which can increase the rate of flow without enlarging the diameter of the tubular body.

In accordance with the present invention, the valve is provided with a tubular body formed at its front end with an inlet, an umbrella-shaped piston axially, movably mounted within the body to close the inlet, a coil spring biassing the piston toward the inlet, and a tail disk axially and removably coupled with the body to back up the spring. The body and the disk are made from a synthetic resin reinforced with fibers. The piston has a spherical portion to close the inlet and a tubular portion extending rearward from the spherical portion to be joined with the front end portion of the spring. The disk is formed with an outlet and a tubular portion to be joined with the rear end portion of the spring. One of the body and the disk has at least a pair of hooks fitted in the respective slits in the other.

When the oil pressure exceeds a preselected value, it pushes the piston away from the inlet against the spring. Then, the oil is allowed to pass through the valve from the inlet to the outlet. The spherical portion of the piston is peripherally formed with a plurality of grooves to increase the cross-sectional area of flow. This means that the valve can increase the minimum cross-sectional area of flow or the rate of flow without enlarging the outer diameter of the tubular body.

The umbrella or mushroom-shaped piston is less massive as compared with the ball piston and makes less frictional contact with the inner periphery of the tubular body as compared with the poppet piston. Therefore, it is quick in response.

The tubular body is made from a synthetic resin, so that the seat fits well with the spherical surface of the piston. The sealing between the seat of the body and the spherical piston permits no oil leakage through the valve. The tail disk is also made of a synthetic resin. Either the body or the disk has at least two hooks for hooking engagement with the respective slits in the other. It is well known that the body and the disk are easily produced within a desired tolerance by an injection-molding process.

The valve is assembled in a simple manner. Firstly, the coil spring has its front and rear end portions fitted on the respective tubular portions of the piston and the disk. Secondly, the disk is so pushed onto the body that the hooks are put in the slits to join the disk with the body as a single tube.

From the foregoing, the advantages offered by the invention are mainly that the valve is quick in response because of having a mushroom or umbrella-shaped piston which is less in mass than a ball piston and less in friction than a poppet or cylindrical piston with a spherical head and furthermore is free from leakage because the synthetic seat fits well with the conical spherical surface of the piston. The valve can have a relatively large rate of flow not by enlarging the outer diameter of the tubular body, but rather by enlarging the cross-sectional area of the grooves formed in the periphery of the piston. The tubular body is easily produced within a desired tolerance by injection molding.

The present invention will become more fully understood from the detailed description given hereinbelow and the accompanying drawings which are given by way of illustration only, and thus, are not limitative of the present invention, and wherein:

BRIEF DESCRIPTION OF THE DRAWINGS

FIG. 1 is a sectional view of the valve according to the present invention;

FIG. 2 is an exploded view of the valve of FIG. 1;

FIGS. 3 and 4 are views respectively similar to FIGS. 1 and 2, of another embodiment; and FIGS. 5 and 6 are views respectively similar to FIGS. 1 and 2, of a further embodiment.

DETAILED DESCRIPTION OF THE INVENTION

Referring now to FIGS. 1 and 2, the check valve 10 has a tubular body 11, an umbrella or mushroom-shaped piston 12 axially, movably mounted in the body 11, a coil spring 13 with a front end portion fitted on the piston, and a tail disk 14 fitted in the rear end portion of the spring 13. The valve components 11, 12, and 14, except the spring 13, are made from a synthetic resin reinforced with fibers. The spring 13 is made from a spring steel. The piston 12 can be made of metal, such as cast iron, steel, and aluminum alloy.

The body 11 is formed at its front end with a circular inlet 15 of which the inside is surrounded by a spherical seat 19 followed by a cylindrical inner surface 20. The seat 19 and the surface 20 are not seen in FIG. 2. The body 11 has three front, middle and rear cylindrical outer portions of which the middle 22 is the largest in diameter and adapted to be press-fitted in a hydraulic circuit. The rear outer portion 23 is formed on its periphery with at least a pair of slits 17 each extending from the rear end to a hole 18.

The piston 12 has a spherical portion 24 of which the outer diameter is slightly smaller than the inner diameter of the cylindrical inner surface 20 of the body 11. The spherical portion 24 is peripherally formed with a plurality of grooves 25 of which the total cross-sectional area corresponds to that of the inlet 15. The piston 12 has a tubular portion 26 extending rearward from the spherical portion 24. The tubular portion 26 is fitted in the front end portion of the coil spring 13. The disk 14 has a ring portion 28 the outer diameter of which is similar to that of the rear cylindrical portion 23 of the body 11 and a tubular portion 27 extending forwardly from the center of the ring portion 28. The tubular portion 27 is fitted in the rear end portion of the coil spring 13. A center bore in the tubular portion 27 and arcuate openings in the ring portion 28 form an outlet 16 of the valve 10. The ring portion 28 has at least a pair of hook levers 29 each extending forwardly along the slits 17 formed in the cylindrical portion 23 of the body 11. The hook lever 29 is formed at its forward end with a hook 30, which is fitted in the hole 18 formed at the forward end of each slit 17 in the cylindrical portion 23.

For assembly of the valve, the coil spring 13 has its front and rear end portions fitted on the respective tubular portions 26, 27 of the piston 12 and the disk 14. Then, the piston 12 is inserted into the tubular body 11 from rear side. After the disk 14 has its hook levers 29 located in the respective slits 17, it is forwardly pushed until the hook 30 is fitted in the hole 18 at the forward end of the slit 17. The assembly is easily made without using any tool nor any jig.

The piston 12 receives oil pressure in the hydraulic circuit through the inlet 15. When the oil pressure exceeds a predetermined value, it pushes the piston 12 against the coil spring 13 to separate the spherical portion 24 from the seat 19. Thus, the valve 10 allows oil to enter from the inlet 15 and flow through the grooves 25 in the outer periphery of the valve piston 12 toward the outlet 16. When the oil pressure lowers, the coil spring 13 puts the piston 12 back on the seat 19 of the body 11 to prevent return of oil from inside to the inlet 15.

As seen in FIGS. 3 and 4, the check valve 10 has a body 11 integrally provided with a pair of hook levers 29 each extending rearward from the cylindrical portion and being formed at its rear end with a hook 30. The tail disk 14 has a ring portion 28 provided at its outer circumference with a pair of holes 18 from which the slits 17 extend forwardly. In assembly, the hook levers 29 and the hooks 30 are respectively engaged with the slits 17 and the holes 18 in the outer periphery of the ring portion 28 to make the body 11 and the disk 14 as a single tube.

In the check valve 10 as shown in FIGS. 5 and 6, the tail disk 14 has no hole formed in its outer periphery of the ring portion 28, while the tubular body 11 is the same as that in the previous embodiment. When the hook levers 29 are fitted in the slits 17, the hooks 30 holds the ring portion 28 from rear side to make the body 11 and the disk 14 as a single tube.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inline-type check valve comprising
   a tubular body made of a synthetic material, said body having a front end formed with an inlet aperture,
   an umbrella-shaped piston axially, movably mounted within said tubular body, said piston having a spherical portion provided at it periphery with a plurality of grooves and a rear tubular portion coaxially extending from said spherical portion, said spherical portion being adapted to close said inlet aperture, p1 a tail disk made of a synthetic material and removably fixed to said tubular body, said tail disk having an outlet aperture and a front tubular portion extending coaxially toward said piston, and
   a coil spring having opposite end portions, said coil spring being disposed between said piston and said tail disk so that said opposite end portions thereof are fitted on said front and rear tubular portions of said tail disk and said piston respectively, whereby when the tail disk is fixed to said tubular body, the umbrella-shaped piston is biased by the coil spring to close said inlet aperture.

2. The check valve of claim 1, wherein said grooves have a cross-sectional area corresponding to that of said inlet aperture.

3. The check valve of claim 1 wherein said body and said disk are made from a synthetic resin reinforced with fibers by injection-molding.

4. The check valve of claim 1, wherein said body and said disk are axially and resiliently hooked to each other to make a single tubular element.

5. The check valve of claim 4, wherein said body is integrally formed with hooks, and said disk is formed with slits for hooking engagement with said hooks.

6. The check valve of claim 4, wherein said body is integrally formed with hooks, and said disk is formed with slits and holes for hooking engagement with said hooks.

7. The check valve of claim 4, wherein said disk is integrally formed with hooks, and said body is formed with slits and holes for hooking engagement with said hooks.

* * * * *